United States Patent
Faaborg et al.

(10) Patent No.: US 10,469,430 B2
(45) Date of Patent: *Nov. 5, 2019

(54) PREDICTIVE FORWARDING OF NOTIFICATION DATA

(71) Applicant: Google LLC, Mountain View, CA (US)

(72) Inventors: Alexander Faaborg, Mountain View, CA (US); Austin Robison, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 15/825,956

(22) Filed: Nov. 29, 2017

(65) Prior Publication Data

US 2018/0091465 A1 Mar. 29, 2018

Related U.S. Application Data

(63) Continuation of application No. 15/183,142, filed on Jun. 15, 2016, now Pat. No. 9,853,931, which is a (Continued)

(51) Int. Cl.
*H04L 12/58* (2006.01)
*H04W 12/06* (2009.01)
(Continued)

(52) U.S. Cl.
CPC ............ *H04L 51/24* (2013.01); *G06F 3/0481* (2013.01); *H04L 51/04* (2013.01); *H04L 51/14* (2013.01);
(Continued)

(58) Field of Classification Search
CPC ......... H04L 51/12; H04L 51/14; H04L 51/24; H04W 68/00–12
See application file for complete search history.

(56) References Cited

U.S. PATENT DOCUMENTS 6,337,972 B1    1/2002  Jones et al.
6,611,204 B2    8/2003  Schmurr
(Continued)

FOREIGN PATENT DOCUMENTS

CN    101044470 A    9/2007
CN    101257375 A    9/2008
(Continued)

OTHER PUBLICATIONS

First Office Action and Search Report, and translation thereof, from counterpart Chinese Application No. 201610245222.9, dated Sep. 5, 2018, 15 pp.

(Continued)

*Primary Examiner* — Patrice L Winder
(74) *Attorney, Agent, or Firm* — Shumaker & Sieffert, P.A.

(57) ABSTRACT

A computing system is described that receives notification data associated with a user, and responsive to determining that the user is interacting with a first computing device at a first particular time, outputs, for transmission to the first computing device, the notification data. The computing system determines that the user is interacting with a second computing device at a second particular time, and responsive to determining, based on the second particular time being less than a threshold amount of time after the first particular time, that the user did not view the notification data at the first computing device, outputs, for transmission to the second computing device, the notification data.

20 Claims, 5 Drawing Sheets

Related U.S. Application Data continuation of application No. 14/242,917, filed on Apr. 2, 2014, now Pat. No. 9,407,591, which is a continuation of application No. 14/102,124, filed on Dec. 10, 2013, now Pat. No. 8,738,723.

(51) Int. Cl.
  *H04W 12/08* (2009.01)
  *G06F 3/0481* (2013.01)
  *H04L 29/08* (2006.01)
  *H04W 4/20* (2018.01)

(52) U.S. Cl.
  CPC .............. *H04L 67/22* (2013.01); *H04L 67/26* (2013.01); *H04W 4/203* (2013.01); *H04W 12/06* (2013.01); *H04W 12/08* (2013.01)

(56) References Cited

U.S. PATENT DOCUMENTS

| | | | |
|---|---|---|---|
| 6,745,025 | B1 | 6/2004 | Chow et al. |
| 6,871,214 | B2 | 3/2005 | Parsons et al. |
| 7,027,773 | B1 | 4/2006 | McMillin |
| 7,076,243 | B2 | 7/2006 | Parupudi et al. |
| 7,096,029 | B1 | 8/2006 | Parupudi et al. |
| 7,215,946 | B1 | 5/2007 | Cardina et al. |
| 7,221,928 | B2 | 5/2007 | Laird et al. |
| 7,243,130 | B2 | 7/2007 | Horvitz et al. |
| 7,249,159 | B1 | 7/2007 | Horvitz et al. |
| 7,493,110 | B2 | 2/2009 | Jiang |
| 7,496,630 | B2 | 2/2009 | Arellano et al. |
| 7,603,421 | B1 | 10/2009 | Roche et al. |
| 7,975,015 | B2 | 7/2011 | Horvitz et al. |
| 8,140,633 | B2 | 3/2012 | Daniell et al. |
| 8,225,000 | B2 | 7/2012 | Xu et al. |
| 8,234,676 | B2 | 7/2012 | Klein et al. |
| 8,315,617 | B2 * | 11/2012 | Tadayon ................. H04W 4/50 455/418 |
| 8,352,546 | B1 | 1/2013 | Dollard |
| 8,483,665 | B2 | 7/2013 | Kissinger et al. |
| 8,484,576 | B2 | 7/2013 | Berson et al. |
| 8,560,632 | B2 | 10/2013 | Kamga et al. |
| 8,570,168 | B2 | 10/2013 | Logan et al. |
| 8,711,732 | B2 | 4/2014 | Johnson |
| 8,738,723 | B1 | 5/2014 | Faaborg et al. |
| 8,779,947 | B2 * | 7/2014 | Tengler ................. H04W 4/00 340/989 |
| 8,818,725 | B2 * | 8/2014 | Ricci ..................... H04W 4/90 701/519 |
| 8,823,507 | B1 | 9/2014 | Touloumtzis |
| 8,897,759 | B2 | 11/2014 | Roka |
| 8,952,802 | B2 * | 2/2015 | Kao ....................... G06Q 10/10 340/309.7 |
| 9,245,036 | B2 * | 1/2016 | Poornachandran .. G06Q 10/109 |
| 9,407,591 | B2 | 8/2016 | Faaborg et al. |
| 9,674,707 | B2 | 3/2017 | Boettcher et al. |
| 9,729,687 | B2 | 8/2017 | Hsieh et al. |
| 2002/0087649 | A1 | 7/2002 | Horvitz |
| 2003/0020749 | A1 | 1/2003 | Abu-Hakima et al. |
| 2004/0098462 | A1 | 5/2004 | Horvitz et al. |
| 2004/0158610 | A1 | 8/2004 | Davis et al. |
| 2005/0075116 | A1 | 4/2005 | Laird et al. |
| 2005/0143139 | A1 | 6/2005 | Park et al. |
| 2005/0277431 | A1 | 12/2005 | White |
| 2005/0277447 | A1 | 12/2005 | Buil et al. |
| 2006/0099940 | A1 | 5/2006 | Pfleging et al. |
| 2006/0133590 | A1 | 6/2006 | Jiang |
| 2007/0072616 | A1 | 3/2007 | Irani |
| 2007/0088553 | A1 | 4/2007 | Johnson |
| 2007/0130323 | A1 | 6/2007 | Landsman et al. |
| 2007/0214228 | A1 | 9/2007 | Horvitz et al. |
| 2007/0291761 | A1 | 12/2007 | Kauniskangas et al. |
| 2008/0002820 | A1 | 1/2008 | Shtiegman et al. |
| 2008/0075066 | A1 | 3/2008 | Baker |
| 2008/0171536 | A1 | 7/2008 | Katz |
| 2009/0054040 | A1 | 2/2009 | van Wijk et al. |
| 2009/0068993 | A1 | 3/2009 | Allen |
| 2009/0122786 | A1 | 5/2009 | Liu et al. |
| 2009/0214014 | A1 | 8/2009 | Cadiz et al. |
| 2009/0276700 | A1 | 11/2009 | Anderson et al. |
| 2009/0307715 | A1 | 12/2009 | Santamaria et al. |
| 2009/0318118 | A1 | 12/2009 | Chang |
| 2009/0326791 | A1 | 12/2009 | Horvitz et al. |
| 2010/0029250 | A1 | 2/2010 | Gupta |
| 2010/0210290 | A1 | 8/2010 | Riley et al. |
| 2010/0219937 | A1 | 9/2010 | Heikes et al. |
| 2010/0223341 | A1 | 9/2010 | Manolescu et al. |
| 2011/0070870 | A1 | 3/2011 | Flynn et al. |
| 2011/0141950 | A1 | 6/2011 | Patil |
| 2011/0185048 | A1 | 7/2011 | Yew et al. |
| 2011/0302247 | A1 | 12/2011 | Narayanan et al. |
| 2012/0002599 | A1 | 1/2012 | Annavajjala et al. |
| 2012/0115451 | A1 | 5/2012 | Roka |
| 2012/0115453 | A1 | 5/2012 | Zheng |
| 2012/0136942 | A1 | 5/2012 | Amidon et al. |
| 2012/0198372 | A1 | 8/2012 | Kuhlke |
| 2012/0311045 | A1 | 12/2012 | Sylvain |
| 2012/0311096 | A1 | 12/2012 | Hurley et al. |
| 2013/0038437 | A1 * | 2/2013 | Talati ...................... B60K 35/00 340/438 |
| 2013/0203442 | A1 | 8/2013 | LeBlanc et al. |
| 2013/0316744 | A1 | 10/2013 | Newham et al. |
| 2013/0295886 | A1 | 11/2013 | Kissinger et al. |
| 2013/0303087 | A1 | 11/2013 | Hauser et al. |
| 2013/0325922 | A1 | 12/2013 | Chaudhri et al. |
| 2013/0339436 | A1 | 12/2013 | Gray |
| 2014/0045480 | A1 | 2/2014 | Hsieh et al. |
| 2014/0149538 | A1 | 5/2014 | Deeter et al. |
| 2014/0155110 | A1 * | 6/2014 | Park ...................... H04M 1/6091 455/458 |
| 2014/0244714 | A1 | 8/2014 | Heiby |
| 2014/0282721 | A1 | 9/2014 | Kuncl et al. |
| 2015/0065055 | A1 | 3/2015 | Newham et al. |
| 2015/0163188 | A1 | 6/2015 | Faaborg et al. |
| 2015/0186092 | A1 | 7/2015 | Francis et al. |
| 2016/0277891 | A1 | 9/2016 | Dvortsov et al. |
| 2016/0301649 | A1 | 10/2016 | Faaborg et al. |

FOREIGN PATENT DOCUMENTS

| | | |
|---|---|---|
| CN | 102938787 A | 2/2013 |
| EP | 2736200 A1 | 5/2014 |
| GB | 2420880 A | 11/2004 |
| WO | 2013085867 A1 | 6/2013 |
| WO | 2014014927 A2 | 1/2014 |

OTHER PUBLICATIONS

Allowance of Patent, and translation thereof, from counterpart Korean application No. 10-2014-0135262, dated May 30, 2017, 3 pp.

Combined Search and Examination Report from GB Application 1412306.1, dated Jul. 31, 2014, 7 pp.

Examination Report from counterpart Australian Patent Application No. 2014206208, dated Dec. 10, 2015, 2 pp.

Notice of Acceptance from Australian Application No. 2014206208, dated Jan. 7, 2016.

Notice of Office Action, and translation thereof, from counterpart Korean Application No. 10-2014-0135262, dated Jan. 18, 2017.

Notification of First Office Action from Chinese Patent Application No. 201410328301.7, dated Oct. 29, 2015 10 pgs.

Prosecution History from U.S. Appl. No. 14/102,124, filed Feb. 28, 2014, 8 pp.

Prosecution History from U.S. Appl. No. 14/242,917, filed Apr. 3, 2014 through Apr. 4, 2016, 27 pgs.

Response to Combined Search and Examination Report from British application No. 1501241.2, filed Jun. 19, 2015 15 pp.

Response to Combined Search and Examination Report from GB Application No. 1412306.1, filed Dec. 1, 2014 13 pp.

Search and Examination Report from counterpart British Patent Application No. 1501241.2, dated Feb. 24, 2015 7 pp.

(56) References Cited

OTHER PUBLICATIONS

Prosecution History from U.S. Appl. No. 15/183,142, filed Jun. 28, 2016 through Oct. 16, 2017, 12 pgs.

"Mount, Power, and Play Your iPod in Your Car with the Belkin TuneBase FM for iPod and TuneBase FM for iPod nano," May 8, 2006, Belkin Press Release [online]. First accessed on Sep. 28, 2011. Retrieved from the Internet: <http://www.belkin.com/au/pressroom/releases/uploads/PR%20TuneBase%20FM.htm> (2 pgs.).

Second Office Action, and translation thereof, from counterpart Chinese Application No. 201610245222.9, dated May 10, 2019, 21 pp.

* cited by examiner

PREDICTIVE FORWARDING OF NOTIFICATION DATA

This application is a Continuation of application Ser. No. 15/183,142, filed on Jun. 15, 2016, which is a Continuation of application Ser. No. 14/242,917, filed on Apr. 2, 2014, now U.S. Pat. No. 9,407,591, which is a Continuation of application Ser. No. 14/102,124, filed on Dec. 10, 2013, now U.S. Pat. No. 8,738,723, the entire contents of each of which are hereby incorporated by reference.

BACKGROUND

A user may interact with a computing device that can receive notification data associated with the user. For instance, a user may interact with a desktop computer which can receive notification data associated with an instant messaging account of the user. While the user interacts with the desktop computer, the desktop computer may receive notification data indicating that the instant messaging account of the user has received a new message. The desktop computer may output a visual, audible, and/or haptic type alert to indicate to the user that the new instant message was received. However, in some instances the user may stop interacting with the desktop computer (e.g., exit the location of the desktop computer, travel beyond the physical range of an output device, or otherwise shift his or her focus away from the desktop computer) and thus miss the notification of the new instant message by failing to hear, see, and/or feel the alert.

SUMMARY

In one example, the disclosure is directed to a method that includes receiving, by a computing system, notification data associated with a user. Responsive to determining that the user is interacting with a first computing device at a first particular time, the method further includes outputting, by the computing system and for transmission to the first computing device, the notification data. The method further includes determining, by the computing system, that the user is interacting with a second computing device at a second particular time, and responsive to determining, based on the second particular time being less than a threshold amount of time after the first particular time, that the user did not view the notification data at the first computing device, outputting, by the computing system and for transmission to the second computing device, the notification data.

In another example, the disclosure is directed to a computing system that includes at least one processor and at least one module operable by the at least one processor to receive notification data associated with a user, and responsive to determining that the user is interacting with a first computing device at a first particular time, output, for transmission to the first computing device, the notification data. The at least one module is further operable by the at least one processor to determine that the user is interacting with a second computing device at a second particular time, and responsive to determining, based on the second particular time being less than a threshold amount of time after the first particular time, that the user did not view the notification data at the first computing device, output, for transmission to the second computing device, the notification data.

In another example, the disclosure is directed to a computer readable storage medium including instructions that, when executed, configure one or more processors of a computing system to receive notification data associated with a user, and responsive to determining that the user is interacting with a first computing device at a first particular time, output, for transmission to the first computing device, the notification data. The computer readable storage medium includes further instructions that when executed configure the one or more processors of the computing system to determine that the user is interacting with a second computing device at a second particular time, and responsive to determining, based on the second particular time being less than a threshold amount of time after the first particular time, that the user did not view the notification data at the first computing device, output, for transmission to the second computing device, the notification data.

The details of one or more examples are set forth in the accompanying drawings and the description below. Other features, objects, and advantages of the disclosure will be apparent from the description and drawings, and from the claims.

DETAILED DESCRIPTION

Figure 1:
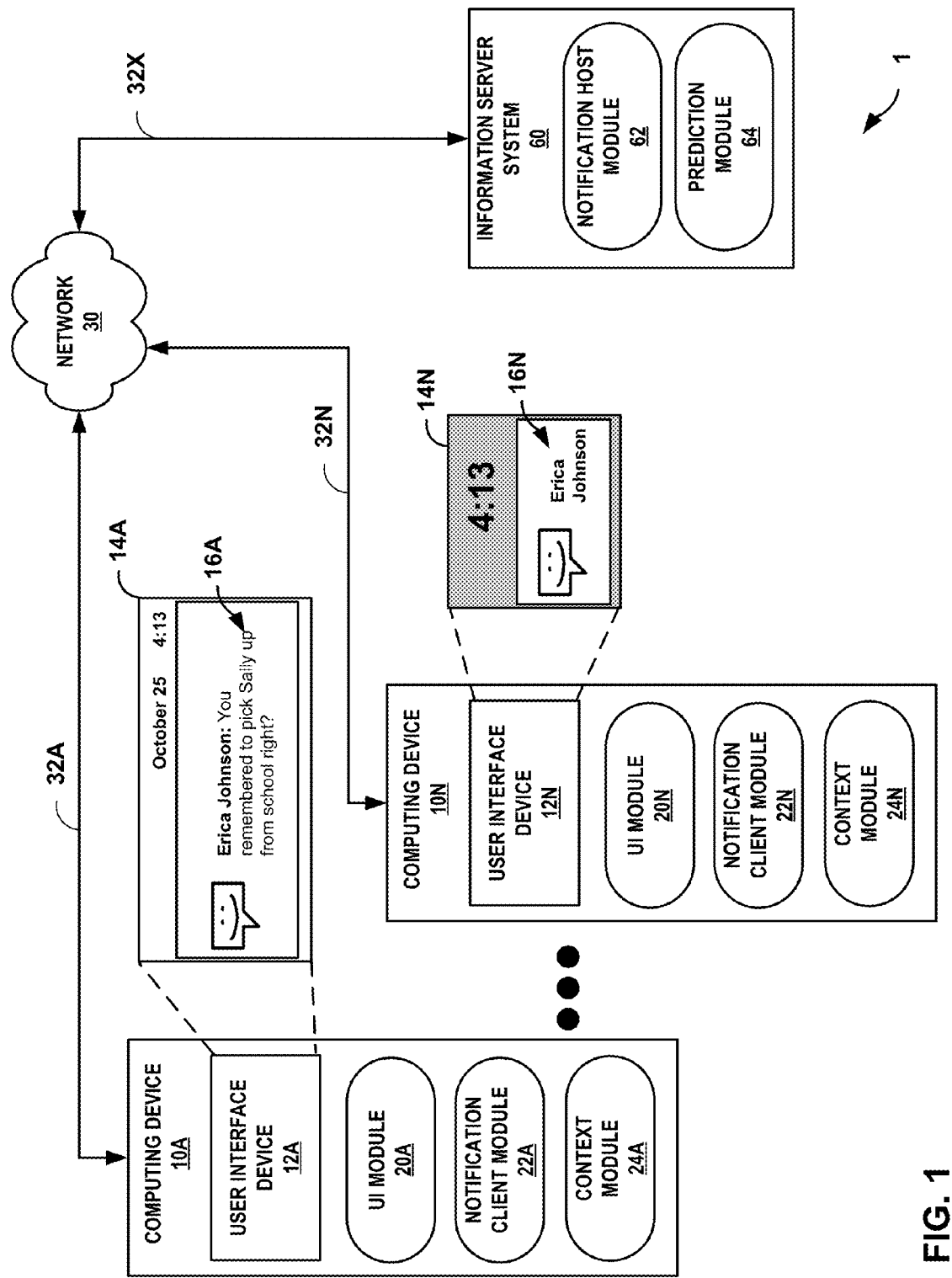
FIG. 1 is a conceptual diagram illustrating an example computing system that outputs notification data to one or more example computing devices, in accordance with one or more aspects of the present disclosure.

In general, techniques of this disclosure may enable a computing system to automatically determine whether or not to output notification data for transmission to a second computing device after previously outputting the notification data for transmission to a first computing device, thereby increasing a likelihood that a user associated with the notification data will receive (e.g., hear, view, and/or feel) an alert based thereon. For example, a user associated with notification data may switch between multiple computing devices such as a desktop or laptop computer, a mobile phone, a wearable computing device (e.g., a computerized watch, computerized eyeglasses, etc.) a tablet, and the like. A computing system (such as a server or cloud based computing platform) may manage transmission of notification data associated with the user across each computing device with which the user may interact. At an earlier particular time, the computing system may determine that the user associated with particular notification data is likely currently interacting with (e.g., is in proximity to and/or using) a first computing device and thus output the notification data for transmission to the first computing device (e.g., to cause the first computing device to output an alert based on the notification data).

At a later particular time, the computing system may determine that the user associated with the notification data is interacting with a second computing device (such as a wearable computing device or a mobile phone) and/or is otherwise no longer interacting with the first computing device, and as a result, may have not viewed, heard, and/or felt) an alert provided by first computing device at the first particular time. To improve a likelihood that the user associated with the notification data obtains the information associated with the notification data, the computing system may responsively output the notification data for transmission to the second computing device for output of a subsequent alert based on the notification data. In this manner, the computing system may cause notification data to "chase" the user from one device to another device (e.g., by outputting notification data for transmission across various computing devices) until the computing system determines that the user likely viewed, heard, and/or felt an alert based on the notification data.

Throughout the disclosure, examples are described where a computing device and/or a computing system may analyze information (e.g., locations, speeds, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, etc.), or to dictate whether and/or how to the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

FIG. 1 is a conceptual diagram illustrating an example computing system 1 that outputs notification data to example computing devices 10A-10N, in accordance with one or more aspects of the present disclosure. Computing system 1 of FIG. 1 is an example computing system that includes computing devices 10A-10N (collectively, "computing devices 10"), information server system 60, and network 30.

Network 30 represents any public or private communication network, for instance, a cellular, Wi-Fi, and/or other type of network for transmitting data between computing devices. Computing devices 10 and information server system 60 may send and receive data across network 30 using any suitable communication techniques. For example, computing device 10A may be operatively coupled to network 30 using network link 32A, and computing device 10N may be operatively coupled to network 30 using network link 32N. Information server system 60 may be operatively coupled to network 30 by network link 32X. Network 30 may include network hubs, network switches, network routers, etc., that are operatively inter-coupled thereby providing for the exchange of information between computing devices 10 and information server system 60. In some examples, network links 32A-32N, and 32X (collectively, "network links 32") may be Ethernet, ATM or other network connections. Such connections may be wireless and/or wired connections.

In the example of FIG. 1, computing device 10A is a desktop computer and computing device 10N is a wearable computing device (e.g., a computerized watch, computerized eyewear, computerized gloves, etc.). However, in other examples, computing devices 10 may be any combination of tablet computers, mobile phones, personal digital assistants (PDA), laptop computers, gaming systems, media players, e-book readers, television platforms, automobile navigation systems, or any other types of mobile and/or non-mobile computing devices that are configured to receive notification data from information server system 60 and output an alert or otherwise provide an indication of the receipt of notification data.

As shown in FIG. 1, computing devices 10A-N each include respective user interface devices (UID) 12A-12N (collectively, "UIDs 12"). UIDs 12 of computing devices 10 may function as respective input and/or output devices for computing devices 10. UIDs 12 may be implemented using various technologies. For instance, UIDs 12 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. UIDs 12 may function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing devices 10.

UIDs 12 may each include respective presence-sensitive displays that may receive tactile input from a user of respective computing devices 10. UIDs 12 may receive indications of tactile input by detecting one or more gestures from a user (e.g., the user touching or pointing to one or more locations of UIDs 12 with a finger or a stylus pen). UIDs 12 may present output to a user, for instance at respective presence-sensitive displays. UIDs 12 may present the output as respective graphical user interfaces (e.g., user interfaces 14A-14N), which may be associated with functionality provided by computing devices 10. For example, UIDs 12 may present various user interfaces related to the functionality of computing platforms, operating systems, applications, and/or services executing at or accessible by computing devices 10 (e.g., electronic message applications, Internet browser applications, mobile or desktop operating systems, etc.). A user may interact with a user interface to cause computing devices 10 to perform respective operations relating to functions.

Computing devices 10 may each include corresponding user interface ("UI") modules 20A-20N (collectively, "UI modules 20"), notification client modules 22A-22N (collectively, "notification client modules 22"), and context information modules 24A-24N (collectively, "context information modules 24"). Modules 20, 22, and 24 may perform operations described using software, hardware, firmware, or a mixture of hardware, software, and firmware residing in and/or executing at respective computing devices 10. Computing devices 10 may each execute respective modules 20, 22, and 24 with one or more processors. Computing devices 10 may execute respective modules 20, 22, and 24 as one or more virtual machines executing on underlying hardware of computing devices 10. Modules 20, 22, and 24 may execute as one or more services or components of operating systems or computing platforms of computing devices 10. Modules 20, 22, and 24 may execute as one or more executable programs at application layers of computing platforms of computing devices 10. UIDs 12 and modules 20, 22, and 24 may be otherwise arranged remotely to and remotely accessible to respective computing devices 10, for instance, as one or more network services operating at network 30 in a network cloud.

Notification client modules 22 may perform functions associated with receiving, managing, and otherwise handling at least a portion of the notification data generated and/or received by platforms, applications, and services executing at computing devices 10. Notification client modules 22 may cause UI modules 20 to output alerts (e.g., an audible alert, a visual alert, a vibration, etc.) to indicate the receipt of notification data by computing devices 10.

Notification client modules 22 may each receive notification data from notification host module 62 of information server system 60 and output the received notification data to a recipient platform, application, and/or service executing at computing devices 10. Notification client modules 22 may receive notification data generated by a respective platform, application, and/or service executing at computing devices 10, and output the received notification data to information server system 60 over links 32.

As used throughout the disclosure, the term "notification data" is used to describe various types of information that may indicate the occurrence of an event associated with various platforms, applications, and services executing within an execution environment at one or more computing devices, such as computing devices 10. For example, notification data may include, but is not limited to, information specifying an event such as: the receipt of a communication message (e.g., e-mail, instant message, SMS, etc.) by a messaging account associated with a user of computing devices 10, the receipt of information by a social networking account associated with a user of computing devices 10, a reminder of a calendar event (meetings, appointments, etc.) associated with a calendar account of a user of computing devices 10, information generated and/or received by a third-party application executing at computing devices 10, the transmittal and/or receipt of inter-component communications between two or more components of platforms, applications, and/or services executing at computing devices 10, etc.

UI modules 20 may cause corresponding UIDs 12 to output respective user interfaces 14A-14N (collectively, "user interfaces 14") (or other example user interfaces) for display, as a user views output and provides input at the respective UIDs 12. The same user may interact with two or more user interfaces 14, at different times. For instance, while in proximity to a location (e.g., an office) of computing device 10A, a user may interact with user interface 14A (e.g., a desktop computing device user interface) and, while away from the location of computing device 10A, the user may interact with user interface 14N (e.g., a wearable computing device user interface).

UI modules 20 may interpret inputs detected at UIDs 12 (e.g., as a user provides one or more gestures at one or more locations of UIDs 12 at which user interfaces 14 are displayed). UI modules 20 may relay information about the inputs detected at UIDs 12 to one or more associated platforms, operating systems, applications, and/or services executing at computing devices 10, to cause computing devices 10 to perform functions.

UI modules 20 may each receive information and instructions from one or more associated platforms, operating systems, applications, and/or services executing at computing devices 10 (e.g., notification client modules 22, etc.) for generating user interfaces 14. In addition, UI modules 20 may each act as respective intermediaries between the one or more associated platforms, operating systems, applications, and/or services executing at each of computing devices 10 and various output devices of computing devices 10 (e.g., speakers, LED indicators, audio or electrostatic haptic output device, etc.) to produce output (e.g., a graphic, a flash of light, a sound, a haptic response, etc.) with computing devices 10.

For instance, user interface 14A is one example graphical user interface for presenting one or more graphical indications of notification data received by computing device 10A. User interface 14A includes graphical indication 16A which represents a visual alert indicative of the receipt, by computing device 10A, of notification data associated with an instant message. User interface 14N is an example graphical user interface for presenting one or more graphical indications of notification data received by computing device 10N. User interface 14N includes graphical indication 16N which represents a visual alert indicative of the receipt, by computing device 10N, of notification data associated with an instant message. User interfaces 14 may include various other types of graphical indications such as a visual alert indicative of the receipt of notification data associated with an e-mail or other type of communication message, a social media network, a calendar appointment or reminder, etc.

UI modules 20 may receive graphical information (e.g., text data, images data, etc.) based on the notification data received by notification client modules 22 as input from notification client modules 22 along with instructions from notification client modules 22 for presenting the graphical information as graphical indications 16A-N (collectively, "graphical indications 16") within user interfaces 14. Based on the graphical information and the instructions received from notification client modules 22, UI modules 20 may each cause corresponding UIDs 12 to present respective graphical indications 16 within respective user interfaces 14 to alert a user of a respective one of computing devices 10 of the receipt of notification data.

Context information modules 24 may each provide contextual information associated with computing devices 10 to prediction module 64 of information server system 60. Context information modules 24 may aggregate contextual information received and/or generated by respective onboard sensors, communication units and radios, input devices, and the like, of computing devices 10. Context information modules 24 may output respective contextual information to information server system 60 for use by prediction module 64 for determining whether a user associated with notification data is interacting with any of computing devices 10 at a particular time. For example, context information modules 24 may aggregate and output sensor information, communications and signal information, and/or information obtained by one or more input devices of computing devices 10 to prediction module 64.

As used throughout the disclosure, the term "contextual information" is used to describe information that can be used by a computing system, such as information server system 60, to determine location and/or degrees of movement associated with one or more computing devices, such as computing devices 10. In some examples, contextual information may include sensor information obtained by one or more sensors (e.g., gyroscopes, accelerometers, proximity sensors, etc.) of computing devices 10, radio transmission information obtained from one or more communication units and/or radios (e.g., global positioning system (GPS), cellular, Wi-Fi, etc.) of computing devices 10, information obtained by one or more input devices (e.g., cameras, microphones, keyboards, touchpads, mice, UIDs 12, etc.) of computing devices 10, and network/device identifier information (e.g., a network name, a device internet protocol address, etc.).

In addition to determining location and/or degrees of movement, contextual information can be used by a computing system, such as information server system 60, to determine the operating state of each of computing devices 10 at a particular time. In other words, based on the contextual information, prediction module 64 may determine whether any of computing devices 10 are active (e.g., powered-on, and/or receiving input), or inactive (e.g., powered-off, on standby, in sleep/screensaver mode, and/or not receiving input), and may use the determination about the operating state of computing devices 10 to determine whether a user is interacting with any of computing devices 10.

Information server system 60 represents any suitable remote computing system, such as one or more desktop computers, laptop computers, mainframes, servers, cloud computing systems, etc. capable of sending and receiving information (e.g., notification data) across network link 32X to network 30. In some examples, information server system represents a host server for a notification system service. One or more of computing devices 10 may access a notification service hosted by information server system 60 for transmitting and/or receiving notification data between platforms, applications, and services executing at the one or more computing devices. In some examples, information server system 60 represents a cloud computing system that provides notification services through network 30 to one or more of computing devices 10 that access the notification services via access to the cloud provided by information server system 60.

In the example of FIG. 1, information server system 60 includes notification host module 62 and prediction module 64. Modules 62 and 64 may perform operations described using software, hardware, firmware, or a mixture of hardware, software, and firmware residing in and/or executing at information server system 60. Information server system 60 may execute modules 62 and 64 with multiple processors or multiple devices. Information server system 60 may execute modules 62 and 64 as a virtual machines executing on underlying hardware. Modules 62 and 64 may execute as one or more services of an operating system or computing platform. Modules 62 and 64 may execute as one or more executable programs at an application layer of a computing platform.

Notification host module 62 may perform functions for routing notification data between one or more of computing devices 10 over network 30. Notification host module 62 may perform functions for hosting a notification service and also, functions for outputting notification data for transmission to one or more of computing devices 10. For example, notification host module 62 may receive notification data that indicates a message was received by an instant messaging account associated with computing devices 10 and may output the notification data for transmission across network 30 to any combination of computing devices 10.

Each of computing devices 10 may receive notification data from notification host module 62 of information server system 60 via a respective one of network links 32. Each of computing devices 10 may output notification alerts based on notification data received from notification host module 62 to indicate the receipt of the notification data by a respective one of computing devices 10.

As described in further detail below, notification host module 62 may first output notification data for transmission to a particular one of computing devices 10 (i.e., computing device 10A or computing device 10N), depending on which one of computing devices 10 that notification host module 62 determines is most likely being used by and "has the focus of" a user associated with the notification data. After outputting the notification data for transmission to the one of computing devices 10 that is most likely being used by the user, notification host module 62 may determine that the user may not have received (e.g., viewed, heard, and/or felt) an alert based on the notification data or otherwise obtained the information associated with the notification data. Notification host module 62 may determine a different one of computing devices 10 that is most likely being used by and has the attention of the user associated with the notification data, and may output the notification data for transmission to the different one of computing devices 10. By outputting the notification data a second time, notification host module 62 may increase the likelihood that the user associated with the notification data receives (e.g., views, hears, and/or feels) an alert based on the notification data or otherwise obtains the information associated with the notification data.

Prediction module 64 may perform functions for predicting which one of computing devices 10 is currently being used by a user associated with notification data. In general, prediction module 64 of information server system 60 may receive "contextual information" from each of computing devices 10 and, based on the contextual information, determine whether a user associated with notification data is or is not interacting with any of computing devices 10. Predication module 64 may respond to queries (e.g., from notification host module 62) requesting information indicating which one of computing devices 10 is more likely being used by a user associated with notification data.

Prediction module 64 may receive contextual information from each of computing devices 10 and determine locations associated with each of computing devices 10 based on the contextual information. For instance, prediction module 64 may receive GPS, cellular, and/or Wi-Fi data from one or more of computing devices 10 and determine respective coordinate locations of the one or more of computing devices 10. In some examples, prediction module 64 may determine relative locations (e.g., an address, a place, a country, a city, a type of building, a business, etc.) of computing devices 10 and/or determine locations of computing devices 10 based on signal triangulation (e.g., a technique for determining a single location based on relative position data received from two or more signals). In other examples, prediction module 64 may determine a location of one of computing devices 10 based on a network identifier associated with the one of computing devices 10.

Prediction module 64 may determine a degree of movement associated with each of computing devices 10 based on the contextual information received from any of computing devices 10. For example, prediction module 64 may determine a speed, acceleration, direction, and/or orientation of any of computing devices 10 based on sensor data received from computing devices 10 and/or based on location data associated with computing devices 10. For instance, prediction module 64 may track the locations of computing devices 10 over time and determine speed, direction, and/or acceleration of computing devices 10 based on changes in the locations of computing devices 10.

Based on the contextual information received from computing devices 10, prediction module 64 may determine a likelihood (e.g., a probability) of whether a user associated with notification data is interacting with any of computing devices 10 at a particular time. For example, prediction module 64 may use machine learning and/or other prediction algorithms and techniques, to determine a probability, based on the contextual information, that a user associated with notification data is interacting with any of computing devices 10 at a particular time. In other words, prediction module 64 may provide the contextual information as one or more signal inputs to a machine learning algorithm and receive as output, a probability indicating whether any of computing devices 10 is likely being used. Prediction module 64 may cause notification host module 62 to output notification data for transmission to the one of computing devices 10 that is more likely being used by the user at a particular time (e.g., in response to a query received from notification host module 62 for information indicating which one of computing devices 10 is more likely being used by the user at a particular time).

In some examples, information server system 60 may receive contextual information from computing devices 10 in substantially real-time. In other examples, information server system 60 may receive contextual information from computing devices 10 at various earlier times and use the earlier information to learn and produce rules for discerning which one of computing devices 10 is being used by a user associated with notification data, at a later time.

Prediction module 64 of information server system 60, and context information modules 24 of computing devices 10 may only collect or make use of information associated with a user of computing devices 10 after providing the user with an opportunity to provide input at computing devices 10 to control whether programs or features of information server system 60 and computing devices 10 can collect and make use of user information (e.g., information about a user's current location, current speed, etc.), or to dictate whether and/or how information server system 60 and computing devices 10 may receive content that may be relevant to the user. In addition, certain data may be treated in one or more ways before it is stored or used by information server system 60 and computing devices 10, so that personally-identifiable information is removed.

In operation, information server system 60 may receive notification data associated with a user. For example, notification host module 62 may receive notification data associated with a user of computing devices 10 indicating that a textual message was received by an instant messaging account of the user.

Responsive to determining that the user is interacting with computing device 10A at an earlier particular time, information server system 60 may output the notification data for transmission to computing device 10A. For instance, notification module 62 may determine, based on information provided by prediction module 64, that contextual information received from computing devices 10 indicates that computing device 10A is being used by the user associated with the notification data. Notification host module 62 may output the notification data over links 32 to computing device 10A.

Information server system 60 may determine that the user associated with the notification data is interacting with computing device 10N at a later particular time. For example, at a later particular time (i.e., after the earlier time at which information server system 60 determined that the user was interacting with computing device 10A), notification host module 62 may receive information from prediction module 64 that indicates computing device 10A is not likely being used by the user and/or computing device 10N is likely being used by the user.

Responsive to determining, based on the later particular time being less than a threshold amount of time after the earlier particular time, that the user did not view the notification data at computing device 10A. Notification host module 62 may determine whether the amount of time between the earlier time and the later time is less than a threshold amount of time (e.g., less than one minute, thirty seconds, etc.) that represents a period of time during which the user may have changed his or her focus away from computing device 10A and missed or otherwise been prevented from being notified by notification client module 22 of computing device 10A of the receipt of the notification data. Information server system 60 may output, for transmission to computing device 10N, the notification data and notification client module 22 of computing device 10N may cause UI module 22N to output an alert based on the notification data (e.g., graphical indication 16N at UID 12).

In this manner, a computing system according to the techniques of this disclosure may cause notification data to "chase" a user associated with the notification data from a first computing device to a second computing device if the computing system determines that a user may have missed the notification data at the first computing device. The computing system may determine that the first computing device received notification data during a period of time when the user associated with the notification data may have been changing focus and shifting his or her attention away from the first computing device. The computing system may "chase the user" and automatically output the notification data to a second computing device that is more likely being used by the user at the current time.

By outputting notification data to a second computing device in this way, the computing system may increase the likelihood that the user receives notifications alerts and/or obtains information associated with notification data. Additionally, the computing system may decrease the likelihood that the user misses notification alerts and/or notification based information. The various computing devices that receive notification data from the computing system in this way may receive fewer inputs from a user interacting with the various computing devices (e.g., to obtain information using a computing device that was already provided as notification data to a different computing device). In turn, the various computing devices may receive fewer false inputs from the user and, as such, the various computing devices and computing system may perform fewer operations and consume less electrical power.

In some examples, prediction module 64 may determine the likelihood (e.g., a probability) of whether the user associated with notification data is interacting with any of computing devices 10 at a particular time based on contextual information received from computing devices 10 that includes input data detected by one or more input devices (e.g., mice, trackballs, touchpads, etc.) of computing device 10. Prediction module 64 may identify specific patterns associated with the input data and identify a series of specific user interactions that indicate whether the user is interacting with any of computing devices 10 based on the identified patterns. Prediction module 64 may use sensor data associated with the contextual information to determine whether any of the identified patterns represent a change in user behavior and indicate that the user is interacting, or is no longer interacting, with computing devices 10.

For example, based on the contextual information, prediction module 64 may determine that input data received from computing device 10A indicates that a user is moving a mouse type input device (e.g., trackball, touch pad, etc.) to interact with computing device 10A (e.g., user interface 14A) at an earlier particular time. At a later particular time, prediction module 64 may determine that the input data indicates that the user is not using the mouse type device.

The machine learning and/or other prediction algorithms and techniques, of prediction module 64 may use the input data received from computing device 10A at the earlier and later particular times, along with accelerometer sensor type data received from computing device 10N at the later and earlier particular times to determine that the user is no longer interacting with computing devices 10A at the later particular time. For example, accelerometer data received from computing device 10N may indicate that the user is moving at the later particular time. Prediction module 64 may determine that the likelihood that the user is interacting with computing device 10A at the later particular time, when the user is moving, and when the user is not using a mouse, is very low, and as such, determine that the user is not interacting with computing device 10A at the later particular time. In other words, prediction module 64 may predict that the user is sitting at computing device 10A at an earlier particular time (as the user is moving the mouse) and determine that the user has gotten up and is no longer sitting at computing device 10A at the later particular time.

In some examples, input data contained within the contextual information received by prediction module 64 may include video data (e.g., received by a webcam of computing device 10A). Prediction module 64 may determine that a user is interacting with any of computing devices 10 based on face and/or retina imaging matching techniques applied to the video data received from a webcam of computing device 10A. In other words, prediction module 64 may determine that an image associated with video data received by a camera of computing device 10A matches or appears similar to a human face, and/or a particular user's face if the user were to view a screen or monitor associated with computing device 10A. Prediction module 64 may determine that the user is interacting with computing device 10A when a human and/or user face is identified by prediction module 64 within a frame of the video data at an earlier particular time. At a later particular time, prediction module 64 may determine that the user is no longer interacting with computing device 10A when the video data does not include a frame of video data that has a human and/or user face.

In some examples, sensor data contained within contextual information associated with computing devices 10 may alone be enough for prediction module 64 to determine whether a user is interacting with any of computing devices 10. For instance, accelerometer data and/or gyro data received from computing device 10N may indicate a position and orientation of computing device 10N and prediction module 64 may determine whether computing device 10N is being held and/or worn, or not being held and/or not being worn based on the position and orientation information. Prediction module 64 may determine, based on accelerometer data, that computing device 10N is resting on a flat, surface and/or determine that computing device 10N is not likely being worn. Or if computing device 10N is a tablet, prediction module 64 may determine, based on accelerometer data, that computing device 10N is lying flat on a surface. Prediction module 64 may determine a high degree of likelihood that computing device 10N is not being used at a particular time for instance, if computing device 10N is wearable and not being worn, or if computing device 10N is a tablet type device and lying flat on a surface (instead of being held by the user).

Figure 2:
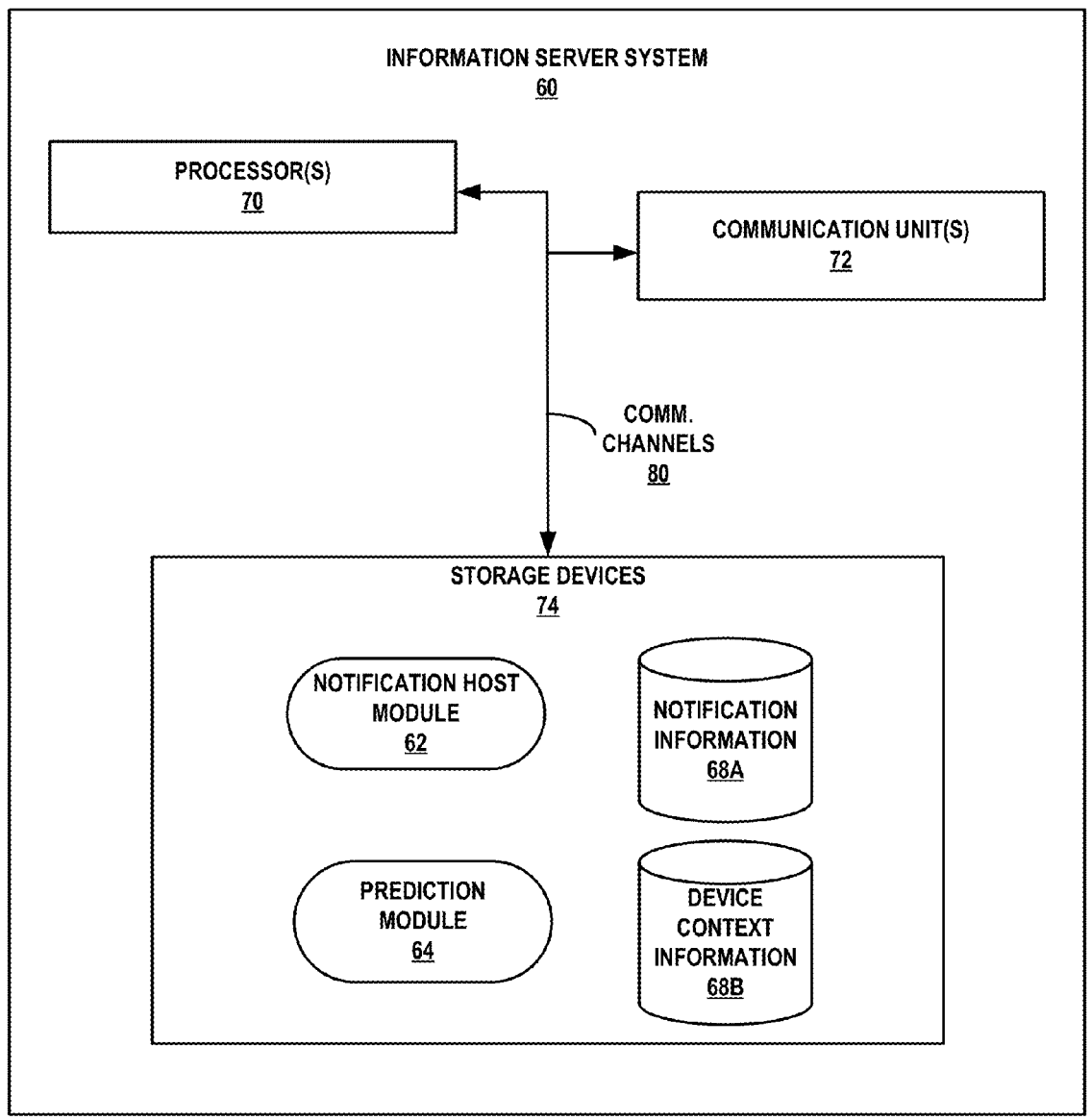
FIG. 2 is a block diagram illustrating an example computing system configured to output notification data, in accordance with one or more aspects of the present disclosure.

FIG. 2 is a block diagram illustrating an example computing system configured to output notification data, in accordance with one or more aspects of the present disclosure. Information server system 60 of FIG. 2 is described below within the context of FIG. 1. FIG. 2 illustrates only one particular example of information server system 60, and many other examples of information server system 60 may be used in other instances and may include a subset of the components included in example information server system 60 or may include additional components not shown in FIG. 2.

As shown in the example of FIG. 2, information server system 60 includes one or more processors 70, one or more communication units 72, and one or more storage devices 74. Storage devices 74 of information server system 60 include notification host module 62 and prediction module 64. Storage devices 74 of information server system 60 further include notification information data store 68A, and device context information data store 68B (collectively, "data stores 68"). Communication channels 80 may interconnect each of the components 70, 72, and 74 for inter-component communications (physically, communicatively, and/or operatively). In some examples, communication channels 80 may include a system bus, a network connection, an inter-process communication data structure, or any other method for communicating data.

One or more communication units 72 of information server system 60 may communicate with external computing devices, such as computing device 10, by transmitting and/or receiving network signals on one or more networks, such as network 30. For example, information server system 60 may use communication unit 72 to transmit and/or receive radio signals via links 32 to exchange information with computing devices 10. Examples of communication unit 72 include a network interface card (e.g. such as an Ethernet card), an optical transceiver, a radio frequency transceiver, a GPS receiver, or any other type of device that can send and/or receive information. Other examples of communication units 72 may include short wave radios, cellular data radios, wireless Ethernet network radios, as well as universal serial bus (USB) controllers.

One or more storage devices 74 within information server system 60 may store information for processing during operation of information server system 60 (e.g., information server system 60 may store data accessed by modules 62 and 64 during execution at information server system 60). In some examples, storage devices 74 are a temporary memory, meaning that a primary purpose of storage devices 74 is not long-term storage. Storage devices 74 on information server system 60 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 74, in some examples, also include one or more computer-readable storage media. Storage devices 74 may be configured to store larger amounts of information than volatile memory. Storage devices 74 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 74 may store program instructions and/or data associated with modules 62 and 64.

One or more processors 70 may implement functionality and/or execute instructions within information server system 60. For example, processors 70 on information server system 60 may receive and execute instructions stored by storage devices 74 that execute the functionality of modules 62 and 64. These instructions executed by processors 70 may cause information server system 60 to store information, within storage devices 74 during program execution. Processors 70 may execute instructions of modules 62 and 64 to provide fitness and navigation information to one or more computing devices (e.g., computing devices 10 of FIG. 1). That is, modules 62 and 64 may be operable by processors 70 to perform various actions or functions of information server system 60.

Data stores 68 represent any suitable storage medium for storing data related to notification data and contextual information. For example, notification information data store 68A may store notification data received by notification host module 62 and device context information data store 68B may store contextual information received by prediction module 64 and associated with, and/or received from, one or more of computing devices 10.

The notification data stored at data store 68A may be sorted, organized, and/or accessed by notification host module 62 according to various attributes associated with the notification data. For instance, in addition to including content (e.g., information associated with the notification data such as text, video, images, etc. associated with a message, calendar reminder, etc.), each portion of notification data received by information server system may include one or more attributes that notification host module 62 uses for determining when to output the notification data and/or which one or more of computing devices 10 of network 30 to route or deliver the notification data.

One attribute may include a user identifier, such as a user name, account name, telephone number, network identifier, e-mail address, etc. that indicates a user recipient associated with the notification data for which computing devices 10 may output an alert based on the notification data and/or otherwise provide access to information associated with the notification data. Notification host module 62 may store received notification data at data store 68A according to the user identifier and may retrieve notification data from data store 68A by querying notification data based on the user identifier.

In some examples, the notification data may include a sender identifier that indicates an origin of the notification data. For example, e-mail or instant message notification data may include an attribute that specifies the e-mail address or instant message account of a user "sender" associated with the notification data. In other words, the sender identifier may indicate an account name associated with a person that typed the e-mail or instant message associated with the notification data.

In some examples, the notification data at notification information data store 68A may include a "priority level" attribute assigned to the notification data by the notification service and/or the origin of the notification data. For example, the computing device and/or system that generates notification data may include a priority attribute associated with the data and determined and/or assigned to the notification data by the sender, so that the sender, by assigning a priority level, can specify a level of importance of the notification data as compared to other types of notification data. The priority level may specify a degree of importance associated with the notification data for causing notification host module 62 to prioritize an output of the notification data. Notification host module 62 may compare a priority level of notification data to one or more priority thresholds to determine when to output notification data to computing devices 10. For instance, a priority level that exceeds a priority threshold may cause notification host module 62 to output the notification data within one particular period or duration of time (e.g., one minute after receipt at information server system 60, thirty seconds after receipt, etc.) and a priority level that does not exceed the threshold may cause notification host module 62 to delay outputting the notification data until a later time (e.g., five minutes after receipt at information server system 60, one hour after receipt, etc.).

In some examples, the notification data at notification information data store 68A may include a "time sensitivity" attribute assigned to the notification data by the notification service and/or the origin of the notification data. The time sensitivity attribute may specify a latest particular time at which to deliver the notification data or otherwise specify an amount of time for which the information associated with the notification data is most relevant to a user associated with the notification data. In some examples, the time sensitivity attribute may mark or tag the notification data with an indication that the information associated with the notification data is time dependent and/or time sensitive. Notification host module 62 may compare the time sensitivity attribute of notification data to a threshold to determine whether the notification data is time sensitive (e.g., if the attribute satisfies the threshold) or whether delivery of the notification data (e.g., via an alert based on the notification data) is not required by a particular time (e.g., if the attribute does not satisfy the threshold).

The contextual information stored at data store 68A may be organized according to one or more individual and/or groups of computing devices 10 and/or according to one or more individual users associated with computing devices 10. For instance, prediction module 64 may receive contextual information from computing devices 10 and categorize the contextual information at device context information data store 68A by grouping the contextual information from each one of computing devices 10 at separate, respective portions or locations of data store 68A. Each separate, respective portion or location of data store 68A may have a label associated with one or more computing devices 10 and may also have a label associated with a user. Prediction module 64 may retrieve contextual information from data store 68A by performing queries for the user label and/or computing device label to obtain the contextual information associated with a specific user and/or specific one or more of computing devices 10.

In some examples, prediction module 64 may collect (i.e., receive) and store (e.g., at device context information data store 68B) contextual information from a number of different computing devices 10 over a period of time, but only if information server system 60 receives explicit permission from the various users of computing devices 10 to receive and analyze the information. For example, in situations discussed herein in which information server system 60 may collect or may make use of personal information about any user (e.g., contextual information), the user may be provided with an opportunity to control whether programs or features of the computing system can collect user information (e.g., a user's current location, a user's speed, a user's direction, etc.). In addition, certain data may be treated in one or more ways before it is stored or used by the computing device, so that personally identifiable information is removed. For example, a user's calendar information, preferences, geographic locations, etc., may be generalized so that an exact user's calendar, preference, and geographic location cannot be determined. Thus, the user may have control over how information is collected about the user and used by information server system 60.

In operation, notification host module 62 may receive notification data associated with a user of computing devices 10 indicating that a textual message was received by an instant messaging account of the user. Notification host module may store at least a portion of the notification data at data store 68A. Notification host module 62 may query prediction module 64 to obtain information, from prediction module 64, indicating which of computing devices 10 that is more likely being used by the user at the particular time.

Prediction module 64 may access device context information data store 68B for contextual information received from one or more computing devices 10 to determine which one of computing devices 10 is most likely being used by the user associated with the notification data, at the particular time. Prediction module 64 may perform a query at data store 68B using a user identifier associated with the notification data to retrieve contextual information associated with the one or more computing devices of computing devices 10 that may be used by the user. Based on the contextual information retrieved from data store 68B, prediction module 64 may determine which of computing devices 10 is most likely being used at the particular time and may further determine which one of computing devices 10 may be better suited for receiving the notification data from notification host module 62 and for gaining the attention of the user by outputting an alert based on the instant message notification data, at the particular time.

For instance, prediction module 64 may determine that contextual information from context information modules 24 indicates that computing device 10A is powered-on and operating in an active state and that one or more input devices of computing device 10A are actively receiving input from the user (e.g., as a user types at a keyboard and/or provides touch input at UID 12A). Based on the contextual information from context information modules 24, prediction module 64 may determine a probability (e.g., using machine learning, or other types or rules based predictive algorithms and techniques) that computing device 10A is being used at the particular time. Responsive to determining that the probability satisfies a probability threshold (e.g., fifty percent), prediction module 64 may determine that the user associated with the notification data is using computing device 10A at the particular time.

In some examples, prediction module 64 may use contextual information received from one of computing devices 10 and stored at data store 68B to determine that a user is using the other one of computing device 10. For example, based on contextual information received from computing device 10A, prediction module 64 may determine that computing device 10A is a desktop computer that is active and stationary at a particular location. Prediction module 64 may determine the user of computing device 10A is likely using and is focused on computing device 10A.

Based on contextual information received from computing device 10N, prediction module 64 may determine that computing device 10N is an inactive, wearable computing device, which is also stationary at the particular location. Although, computing device 10N is inactive, prediction module 64 may receive contextual information from computing device 10N that indicates computing device 10N is being actively worn (e.g., based on sensor information indicating a galvanic skin response, temperature, orientation, and or other movement, that indicates that computing device 10N is on a person's wrist). Prediction module 64 may determine the user of computing device 10A is not likely using and/or focused on computing device 10N.

Responsive to determining that the user is interacting with computing device 10A at an earlier particular time, information server system 60 may output the notification data for transmission to computing device 10A. For example, notification host module 62 may receive information from prediction module 64 that indicates that computing devices 10A has a higher probability of being used at the earlier particular time than the probability of computing device 10N being used at the earlier particular time. Notification host module 62 may sent the notification data over communication channels 50 to communication units 72 that may output the notification data over links 32 to notification client module 22A of computing device 10A. Notification client module 22A of computing device 10A may output graphical information and/or instructions to command UI module 20A to cause UID 12A to output an alert (e.g., graphical indication 16A, and the like) based on the notification data.

To increase a likelihood that the user associated with the notification data obtains information associated with the notification data and/or receives an alert based on the notification data, notification host module 62 may determine whether the user associated with the notification data continues to interact with computing device 10A at a later particular time (e.g., after the earlier particular time at which notification host module 62 first outputs the notification data for transmission to computing device 10A). If notification host module 62 determines that the user is interacting with computing device 10N at the later particular time, notification host module 62 may infer that the user may have missed the notification data during the period of time (e.g., between the earlier particular time and the later particular time) at which the user changed his or her focus and stopped using computing device 10A and/or began using computing device 10N.

Information server system 60 may determine that the user is interacting with computing device 10N at a later particular time. For example, at the later particular time, notification host module 62 may query prediction module 64 for information indicating which one of computing devices 10 is more likely being used by the user and receive an indication that computing device 10A is not likely being used by the user and/or computing device 10N is likely being used by the user.

Responsive to determining, based on the later particular time being less than a threshold amount of time after the earlier particular time, that the user did not view the notification data at computing device 10A, information server system 60 may output, for transmission to computing device 10N, the notification data. In other words, notification host module 62 may determine whether the user associated with the notification data likely missed the notification data (e.g., an alert provided by computing device 10A) by comparing the earlier time at which the notification data was first output for transmission to computing device 10A to the later time at which the user may have begun using computing device 10A and/or may have stopped using computing device 10N. Notification host module 62 may determine whether the amount of time between the earlier time and the later time is less than a threshold amount of time (e.g., less than one minute, thirty seconds, etc.). The threshold may represent a period of time during which the user may have changed his or her focus away from computing device 10A and missed or otherwise been prevented from being notified by notification client module 22 of computing device 10A of the receipt of the notification data.

Notification host module 62 may output the notification data to computing device 10N. Notification client module 22N of computing device 10N may cause UI module 22N to output an alert based on the notification data (e.g., graphical indication 16N at UID 12N).

In some examples, information server system 60 may output notification data for transmission to a second computing device after first outputting the notification data for transmission to a first computing device, in response to determining that a priority level of the notification data satisfies a threshold. In other words, notification host module 62 may determine whether a priority level of notification data satisfies a priority threshold before determining whether or not to "chase" a user with notification data by outputting the notification data at a second one of computing devices 10 at a later particular times when notification host module 62 determines that the user did or did not likely receive (e.g., viewed, heard, and/or felt) an alert based on notification data or otherwise obtained information associated with the notification data when the notification data was output for transmission to a first one of computing devices 10, at an earlier particular time. If a priority level of the notification data satisfies a threshold (e.g., for indicating more important notification data), notification host module 62 may query prediction module 64 for information indicating which one of computing devices 10 that is most likely being used by the user and may cause communication modules 72 to output the notification data for transmission to that most likely one of computing devices 10.

In some examples, information server system 60 may output notification data for transmission to a second computing device after first outputting the notification data for transmission to a first computing device, in response to determining that the notification data includes time sensitive information. In other words, notification host module 62 may determine whether a time sensitivity attribute of received notification data indicates that the information associated with the notification data will expire at a particular time, before determining whether or not to "chase" the user associated with the notification data and output the notification data at second, third, fourth, etc. computing devices 10 at later particular times until notification host module 62 determines that the user likely received (e.g., viewed, heard, and/or felt) an alert based on notification data or otherwise obtained the information associated with the notification data. If notification host module 62 determines that the information associated with the notification data is time sensitive (e.g., by analyzing a time sensitivity attribute), notification host module 62 may query prediction module 64 for information indicating which one of computing devices 10 that is most likely being used by the user and may cause communication modules 72 to output the notification data for transmission to that most likely one of computing devices 10.

In some examples, information server system 60 may output notification data for transmission to a second computing device after first outputting the notification data for transmission to a first computing device, in response to determining that a sender identifier associated with the notification data corresponds to an entry of an electronic address book or contact list. In other words, notification host module 62 may chase a user associated within notification data after determining that the notification data is associated with a contact of a contact list associated with the user. For example, notification host module 62 access or store information associated with an address book or contact list associated with a user (e.g., via a cloud service accessible to information server system 60). Notification host module 62 may correlate a sender identifier of notification data with one or more entries of an electronic address book or contact lists associated with a user to determine whether the sender identifier corresponds to an entry in the address book or contact list. Notification host module 62 may "chase" a user (e.g., by outputting the notification data to different one of computing devices 10 at a later time until notification host module 62 determines that the user associated with the notification data likely received an alert based on the notification data or otherwise obtained the information associated with the notification data) and output the notification data to a second computing device when the sender is contained within an electronic address book or contact list associated with the user and/or not chase the user when the sender is not contained within the address book or contact list.

Figure 3:
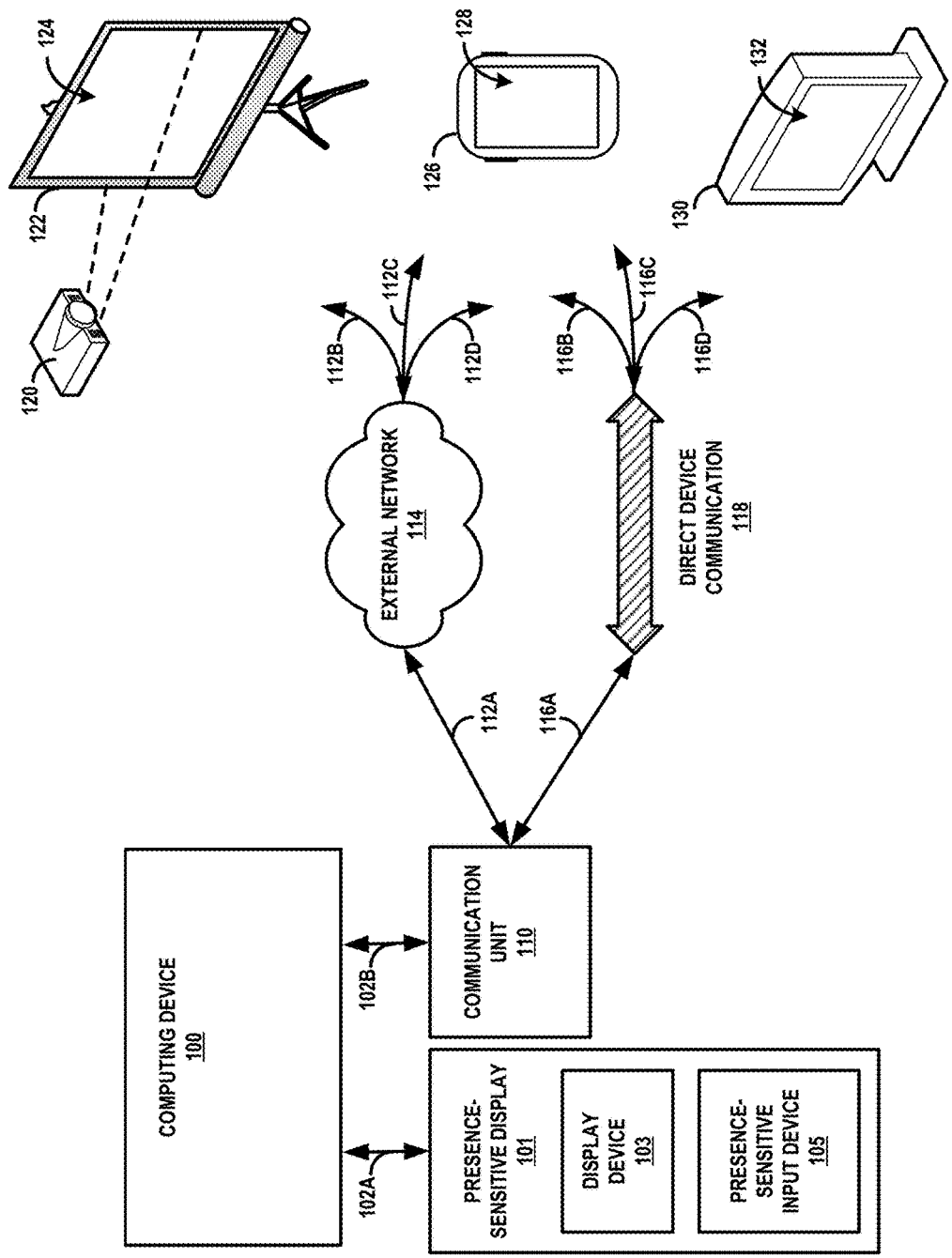
FIG. 3 is a block diagram illustrating an example computing device that outputs graphical content for display at a remote device, in accordance with one or more techniques of the present disclosure.

FIG. 3 is a block diagram illustrating computing device 100 that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, mobile device 126, and visual display device 130. Although shown for purposes of example in FIG. 1 as multiple stand-alone computing devices 10, a computing device such as one of computing devices 10, and computing device 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processors 70 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing devices 10 in FIG. 1, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures, etc.) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, heads up display (HUD) and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures, etc.) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic display of computing eye glasses), may receive data from computing device 100 and display the graphical content. In some examples, presence-sensitive display 124 may determine one or more inputs (e.g., continuous gestures, multi-touch gestures, single-touch gestures, etc.) at projector screen 122 using capacitive, inductive, and/or optical recognition techniques and send indications of such input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, computerized watches, computerized eyeglasses, etc. Examples of visual display device 130 may include other semi-stationary devices such as televisions, computer monitors, automobile displays, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of UID 12 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more inputs (e.g., continuous gestures, multi-touch gestures, single-touch gestures, etc.) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Computing device 100 may receive notification data as output from a computing system (e.g., information server system 60 of FIGS. 1 and 2). For instance, the computing system may determine that a user associated with the notification data is likely interacting with computing device 100 at a particular time and in response, output the notification data for transmission to computing device 100.

Responsive to receiving the notification data, computing device 100 may output an alert indicative of the receipt of the notification data. For examples, computing device 100 may output, for display, a graphical indication (e.g., graphical indication 16A) based on the notification data to visual display device 130. Computing device 100 may output, for display, the graphical indication based on the notification data via direct device communication 118 or external network 114 to display device 130. In some examples, display device 130 outputs the graphical indication for display to the user associated with the notification data and the user may, in turn, interact with computing device 100 by selecting or dismissing some or all of the displayed graphical indication based on the notification data. Computing device 100 and display device 130 may be configured such that selection of a particular element of the displayed graphical based on the notification data, may cause computing device 100 to obtain additional information (e.g., text of an instant message, etc.) associated with the notification data.

Figure 4:
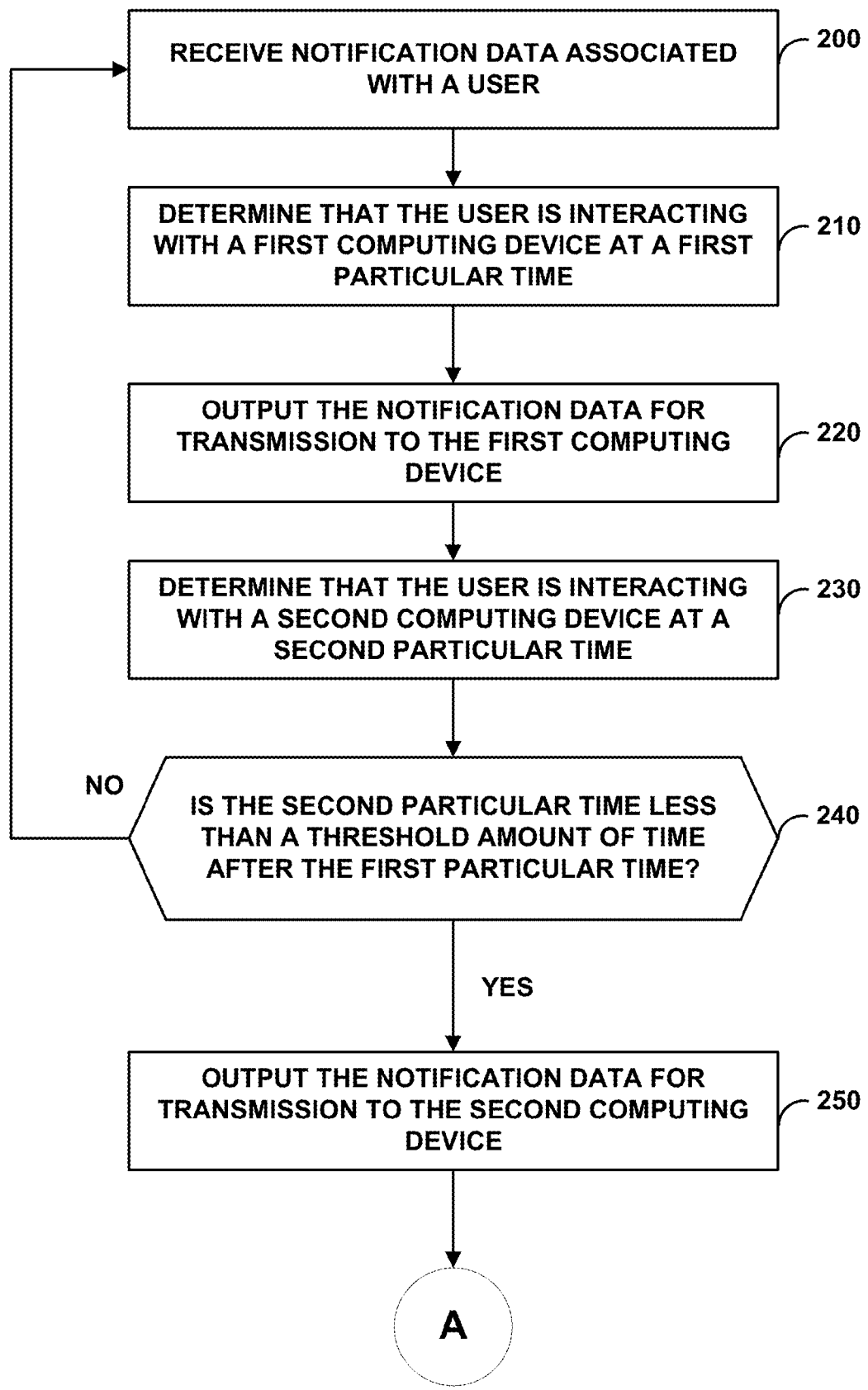
FIGS. 4 and 5 are flowcharts illustrating example operations of an example computing system configured to output notification data to one or more example computing devices, in accordance with one or more aspects of the present disclosure.
Figure 5:
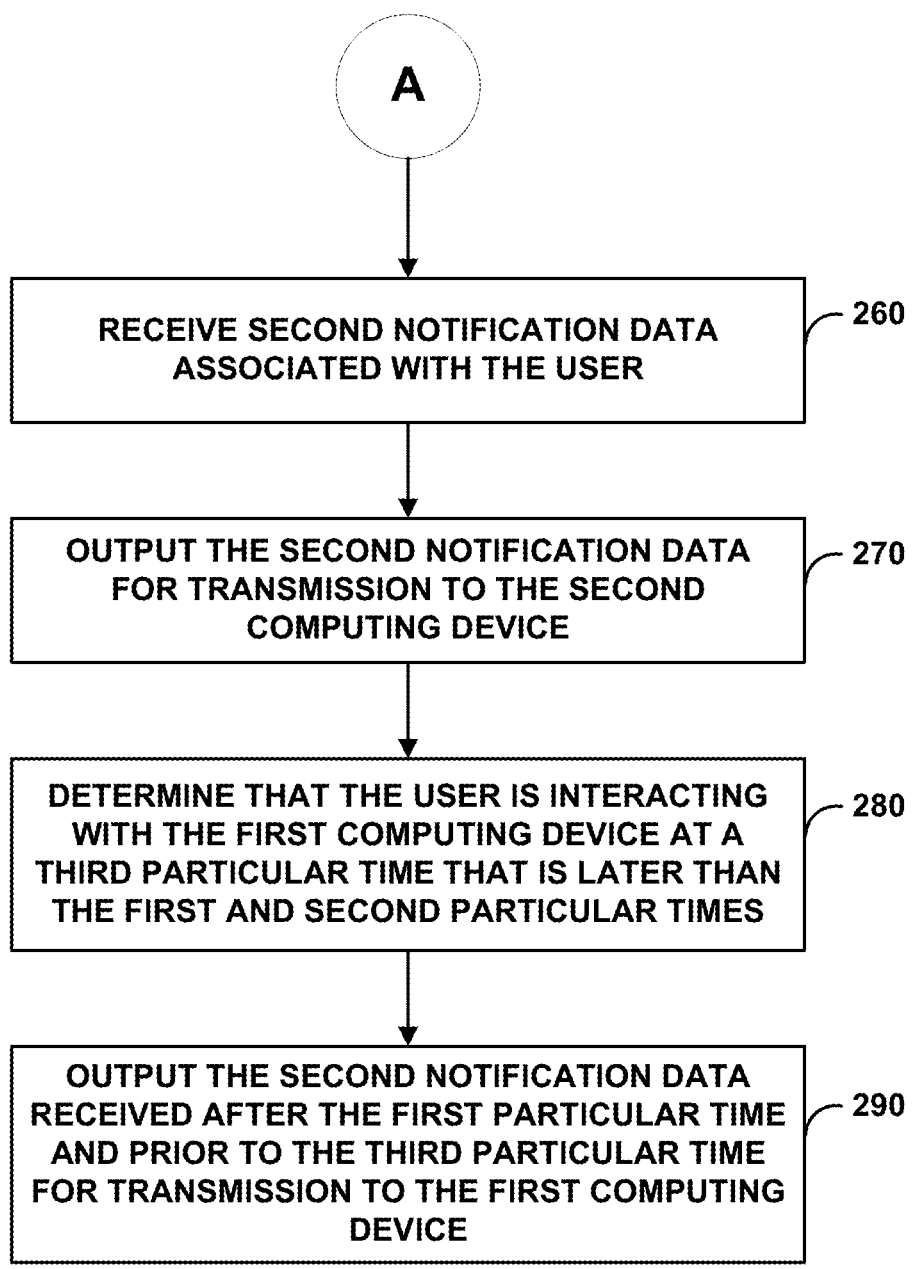

FIGS. 4 and 5 are flowcharts illustrating example operations of an example computing system configured to output notification data to one or more example computing devices, in accordance with one or more aspects of the present disclosure. The processes of FIGS. 4 and 5 may be performed by one or more processors of a computing system, such as information server system 60 illustrated in FIG. 1 and FIG. 2. For purposes of illustration, FIGS. 4 and 5 are described below within the context of information server system 60, computing devices 10, and system 1, illustrated in FIG. 1.

FIG. 4 illustrates that information server system 60 may receive notification data associated with a user (200). For example, information server system 60 may receive notification data indicative of the receipt of an e-mail message addressed to an e-mail account accessed by a user of computing devices 10.

Information server system 60 may determine that the user is interacting with a first computing device at a first particular time (210). For example, prediction module 64 may output information to notification host module 62 that indicates that the user of computing devices 10 is likely interacting with computing device 10A at a first particular time.

FIG. 4 shows that information server system 60 may output the notification data for transmission to the first computing device (220). For example, notification host module 62 may cause information server system 60 to output the notification data via links 32 to notification client module 22A of computing device 10A.

In some examples, information server system 60 may output the notification data for transmission to the first computing device (e.g., computing device 10A) in response to determining that the user is interacting with the first computing device at the first particular time and may not output the notification data for transmission to other computing devices 10, including the second computing device (e.g., computing device 10N), at the first particular time. In other words, information server system 60 may exclusively output the notification data for transmission to the single computing device (e.g., computing device 10) that information server system 60 determines is more likely being used at the first particular time.

Information server system 60 may determine that the user is interacting with a second computing device at a second particular time (230). For example, notification host module 62 may determine that the notification data is associated with a contact in an address book or contact list associated with the user, or that a priority level associated with the notification data exceeds a priority threshold, and/or that the notification data includes time sensitive information. To increase a likelihood that the user associated with the notification data receives an alert based on the notification data or otherwise obtains the notification data that information server system 60 output at the first (earlier) particular time, notification host module 62 may query prediction module 64 for an updated indication of whether the user is interacting with computing device 10A or not at a second (later) particular time. In other words, notification host module 62 may determine that the user did not view the notification data at the first computing device by determining that the user is not interacting with the first computing device at the second particular time. Notification host module 62 may receive information from prediction module 64 which indicates, that at the second particular time, the user is more likely interacting with computing device 10N and/or is not likely interacting with computing device 10A.

In some examples, information server system 60 may determine that the user did not view the notification data at the first computing device by first receiving contextual information associated with the second computing device, and determining, based on the contextual information, that the user is not interacting with the first computing device at the second particular time. In other words, prediction module 64 may receive contextual information from computing device 10N and determine, based on the contextual information received from computing device 10N, that the user is not using computing device 10A. Prediction module 64 may determine that a user is not interacting with one of computing devices 10, such as a desktop computer, based on contextual information (e.g., sensor information, etc.) received from a different one of computing devices 10, such as a computerized watch.

FIG. 4 shows information server system 60 may determine whether the second particular time is less than a threshold amount of time after the first particular time (240). For instance, notification host module 62 may determine that the second particular time is too close in time to the first particular time and indicates that the user may have missed an alert based on the notification data at computing device 10A (e.g., by shifting his or her focus away from computing device 10A viewing, hearing, and/or feeling an alert based on the notification data at computing device 10A).

If information server system 60 determines that the second particular time is less than the threshold amount of time after the first particular time, information server system 60 may output the notification data for transmission to the second computing device (250). For instance, information server system 60 may output the notification data for transmission to computing device 10N in an attempt to "chase" the user and cause one of computing devices 10 that is most likely being used by the user at the second particular time to output an alert based on the notification data.

In some examples, responsive to determining that the user is interacting with the first computing device at a third particular time after the second particular time, information server system 60 may output the notification data for transmission to computing device 10A. In other words, after outputting the notification data to computing device 10N, information server system 62 may determine that the user is likely interacting with computing device 10A again and may output the notification data via a second transmission to computing device 10A.

FIG. 5 illustrates further operations of information server system 60. For instance, FIG. 5 shows an additional example of operations of information server system 60 that may be performed by information server system 60 from step 250 of FIG. 4.

FIG. five shows information server system 60 may receive second notification data associated with the user (260). For example, information server system 60 may receive additional notification data, the additional notification data being indicative of the receipt of an instant message addressed to an instant message account accessed by the user of computing devices 10.

Information server system 60 may output the second notification data for transmission to the second computing device (270). For example, notification host module 62 may receive information from prediction module 64 that indicates the user associated with the notification data continues to interact with computing device 10N. Notification host module 62 may transmit the additional notification data to computing device 10N and cause notification client module 22N and UI module 20N to output an alert based on the additional notification data.

Information server system 60 may determine that the user is interacting with the first computing device at a third particular time after the first and second particular times (280). In other words, at a third particular time, after the first and second particular times, notification module 62 may receive information from prediction module 64 that indicates that the user has likely began interacting again with computing device 10A. Notification host module 62 may determine that the third particular time is less than the threshold amount of time after the second particular time and determine that the user may not have viewed, heard, and/or felt (e.g., received) an alert based on the additional notification data at computing device 10N.

Information server system 60 may output the second notification data received after the first particular time and prior to the third particular time for transmission to the first computing device (290). In other words, responsive to determining that the user is interacting with computing device 10A at a third particular time after the second particular time, information server system 62 may output, for transmission to computing device 10A, the additional notification data received by information server system 62 after the first particular time and prior to the third particular time. In this manner, information server system 62 may chase the user associated with notification data back and forth between computing devices 10. Information server system 62 may output first notification data (e.g., an e-mail based notification) at computing device 10A and then "chase" and output the first notification data at computing device 10N. After receiving additional notification data (e.g., an instant message based notification) information server system 62 may output the additional notification data for transmission to computing device 10N and then "chase" and output the additional notification data for transmission to computing device 10A.

In some examples, information server system 62 may determine whether a user is interacting with any of computing device 10 based on face detection techniques. For instance, computing device 10A may include a camera (e.g., a web camera, etc.). Information server system 62 may receive video data captured by the camera of computing device 10A and using facial recognition techniques and/or algorithms, determine whether or not an image of a human face is contained with the video data. In cases when a human face is detected within the video data, information server system 62 may determine that the user is interacting with computing device 10A. In cases when a human face is not detected within the video data, information server system 62 may determine that the user is not interacting with computing device 10A. In some examples, retina scanning or other image matching techniques may be used to determine whether an image associated with still image or motion video data received from any of computing devices 10 indicates whether or not a user is interacting with any of computing devices 10.

Clause 1. A method, comprising: receiving, by a computing system, notification data associated with a user; responsive to determining that the user is interacting with a first computing device at a first particular time, outputting, by the computing system and for transmission to the first computing device, the notification data; determining, by the computing system, that the user is interacting with a second computing device at a second particular time; and responsive to determining, based on the second particular time being less than a threshold amount of time after the first particular time, that the user did not view the notification data at the first computing device, outputting, by the computing system and for transmission to the second computing device, the notification data.

Clause 2. The method of clause 1, wherein determining that the user did not view the notification data at the first computing device further comprises determining that the user is not interacting with the first computing device at the second particular time.

Clause 3. The method of any of clauses 1-2, wherein the notification data is output for transmission to the first computing device in response to determining that the user is interacting with the first computing device at the first particular time and is not output for transmission to other computing devices, including the second computing device, at the first particular time.

Clause 4. The method of any of clauses 1-3, wherein outputting, by the computing system and for transmission to the second computing device, the notification data is further responsive to determining that a priority level of the notification data satisfies a threshold.

Clause 5. The method of any of clauses 1-4, wherein outputting, by the computing system and for transmission to the second computing device, the notification data is further responsive to determining that the notification data includes time sensitive information.

Clause 6. The method of any of clauses 1-5, wherein outputting, by the computing system and for transmission to the second computing device, the notification data is further responsive to determining that the notification data is associated with a contact of a contact list associated with the user.

Clause 7. The method of any of clauses 1-6, further comprising responsive to determining that the user is interacting with the first computing device at a third particular time after the second particular time, outputting, by the computing system, for transmission to the first computing device, the notification data.

Clause 8. The method of any of clauses 1-7, wherein the notification data comprises first notification data, the method further comprising responsive to determining that the user is interacting with the first computing device at a third particular time after the second particular time, outputting, for transmission to the first computing device, second notification data received by the computing system after the first particular time and prior to the third particular time.

Clause 9. The method of any of clauses 1-8, wherein determining that the user did not view the notification data at the first computing device further comprises: receiving, by the computing system, contextual information associated with the second computing device; and determining, by the computing system and based on the contextual information, that the user is not interacting with the first computing device at the second particular time.

Clause 10. A computing system comprising: at least one processor; and at least one module operable by the at least one processor to: receive notification data associated with a user; responsive to determining that the user is interacting with a first computing device at a first particular time, output, for transmission to the first computing device, the notification data; determine that the user is interacting with a second computing device at a second particular time; and responsive to determining, based on the second particular time being less than a threshold amount of time after the first particular time, that the user did not view the notification data at the first computing device, output, for transmission to the second computing device, the notification data.

Clause 11. The computing system of clause 10, wherein the at least one module is further operable by the at least one processor to determine that the user did not view the notification data at the first computing device by at least determining that the user is not interacting with the first computing device at the second particular time.

Clause 12. The computing system of any of clauses 10-11, wherein the at least one module is further operable by the at least one processor to output the notification data for transmission to the first computing device in response to determining that the user is interacting with the first computing device at the first particular time and to not output the notification data for transmission to other computing devices, including the second computing device, at the first particular time.

Clause 13. The computing system of any of clauses 10-12, wherein the at least one module is further operable by the at least one processor to output the notification data responsive to determining that the user did not view the notification data at the first computing device further responsive to determining that a priority level of the notification data satisfies a priority threshold.

Clause 14. The computing system of any of clauses 10-13, wherein the at least one module is further operable by the at least one processor to output the notification data responsive to determining that the user did not view the notification data at the first computing device and further responsive to determining that the notification data includes time sensitive information.

Clause 15. The computing system of any of clauses 10-14, wherein the at least one module is further operable by the at least one processor to output the notification data responsive to determining that the user did not view the notification data at the first computing device, and further responsive to determining that the notification data is associated with a contact of a contact list associated with the user.

Clause 16. The computing system of any of clauses 10-15, wherein the at least one module is further operable by the at least one processor to responsive to determining that the user is interacting with the first computing device at a third particular time after the second particular time, output, for transmission to the first computing device, the notification data.

Clause 17. The computing system of any of clauses 10-16, wherein the notification data comprises first notification data, and wherein the at least one module is further operable by the at least one processor to responsive to determining that the user is interacting with the first computing device at a third particular time after the second particular time, output, for transmission to the first computing device, second notification data received after the first particular time and prior to the third particular time.

Clause 18. The computing system of any of clauses 10-17, wherein the at least one module is further operable by the at least one processor to determine that the user did not view the notification data at the first computing device by at least receiving contextual information associated with the second computing device, and determining, based on the contextual information, that the user is not interacting with the first computing device at the second particular time.

Clause 19. The computing system of any of clauses 10-18, wherein the first computing device is a non-mobile computing device and the second computing device is a mobile computing device, wherein the at least one module is further operable by the at least one processor to determine that the user did not view the notification data at the first computing device based at least in part on contextual information associated with the second computing device, wherein the contextual information comprises sensor information of the second computing device.

Clause 20. A computer-readable storage medium comprising instructions that, when executed, configure one or more processors of a computing system to: receive notification data associated with a user; responsive to determining that the user is interacting with a first computing device at a first particular time, output, for transmission to the first computing device, the notification data; determine that the user is interacting with a second computing device at a second particular time; and responsive to determining, based on the second particular time being less than a threshold amount of time after the first particular time, that the user did not view the notification data at the first computing device, output, for transmission to the second computing device, the notification data.

Clause 21. A computing device comprising means for performing any of the methods of clauses 1-9.

Clause 22. A computer-readable storage medium encoded with instructions for causing one or more programmable processors to perform any of the methods recited by clauses 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   outputting, at a mobile computing device and exclusively via one or more output devices of the mobile computing device, at a first particular time, an indication of notification data associated with a user;
   determining that the user is not interacting with the mobile computing device at a second particular time, the second particular time occurring a threshold amount time after the first particular time; and
   responsive to determining that the user is not interacting with the mobile computing device at the second particular time, outputting, for display exclusively via an automobile display, the notification data.

2. The method of claim 1, wherein outputting the notification data is responsive to determining that the user is interacting with the automobile display at the second particular time.

3. The method of claim 1, wherein the mobile computing device is a mobile telephone or a computerized watch.

4. The method of claim 1, wherein outputting the notification data is further responsive to determining that the user did not hear, feel, or view the indication of the notification data that was output by the mobile computing device at the first particular time.

5. The method of claim 1, wherein determining that the user is not interacting with the mobile computing device at the second particular time is based at least in part on determining that the user is interacting with the automobile display at the second particular time.

6. The method of claim 1, wherein determining that the user is not interacting with the mobile computing device at the second particular time is based at least in part on determining that the mobile computing device is at least one of not being held or is not being worn.

7. The method of claim 1, wherein the indication of the notification data is an initial indication, the method further comprising:
   responsive to determining that the user is interacting with the mobile computing device at a third particular time, outputting, by the mobile computing device, a subsequent indication of the notification data, the third particular time occurring after the notification data is output for display at the automobile display.

8. The method of claim 7, wherein the subsequent indication of the notification date is output further in response to determining that the mobile computing device is at least one of being held or is being worn.

9. A mobile computing device comprising:
at least one processor configured to:
output, exclusively via one or more output devices of the mobile computing device, at a first particular time, an indication of notification data associated with a user;
determine that the user is not interacting with the mobile computing device at a second particular time, the second particular time occurring a threshold amount time after the first particular time; and
responsive to determining that the user is not interacting with the mobile computing device at the second particular time, output, for display exclusively via an automobile display, the notification data.

10. The mobile computing device of claim 9, wherein the at least one processor is configured to output the notification data in response to determining that the user is interacting with the automobile display at the second particular time.

11. The mobile computing device of claim 9, wherein the mobile computing device is a mobile telephone or a computerized watch.

12. The mobile computing device of claim 9, wherein the at least one processor is configured to output the notification data responsive to determining that the user did not hear, feel, or view the indication of the notification data that was output by the mobile computing device at the first particular time.

13. The mobile computing device of claim 9, wherein the at least one processor is configured to determine that the user is not interacting with the mobile computing device at the second particular time based at least in part on determining that the user is interacting with the automobile display at the second particular time.

14. The mobile computing device of claim 9, wherein the at least one processor is configured to determine that the user is not interacting with the mobile computing device at the second particular time based at least in part on determining that the mobile computing device is at least one of not being held or is not being worn.

15. A computer-readable storage medium comprising instructions that, when executed, cause one or more processors of a mobile computing device to:
output, exclusively via one or more output devices of the mobile computing device, at a first particular time, an indication of notification data associated with a user;
determine that the user is not interacting with the mobile computing device at a second particular time, the second particular time occurring a threshold amount time after the first particular time; and
responsive to determining that the user is not interacting with the mobile computing device at the second particular time, output, for display exclusively via an automobile display, the notification data.

16. The computer-readable storage medium of claim 15, wherein the instructions, when executed, cause the one or more processors to output the notification data in response to determining that the user is interacting with the automobile display at the second particular time.

17. The computer-readable storage medium of claim 15, wherein the mobile computing device is a mobile telephone or a computerized watch.

18. The computer-readable storage medium of claim 15, wherein the instructions, when executed, cause the one or more processors to output the notification data responsive to determining that the user did not hear, feel, or view the indication of the notification data that was output by the mobile computing device at the first particular time.

19. The computer-readable storage medium of claim 15, wherein the instructions, when executed, cause the one or more processors to determine that the user is not interacting with the mobile computing device at the second particular time based at least in part on determining that the user is interacting with the automobile display at the second particular time.

20. The computer-readable storage medium of claim 15, wherein the instructions, when executed, cause the one or more processors to determine that the user is not interacting with the mobile computing device at the second particular time based at least in part on determining that the mobile computing device is at least one of not being held or is not being worn.

* * * * *